US011645335B2

(12) United States Patent
Cheng et al.

(10) Patent No.: US 11,645,335 B2
(45) Date of Patent: May 9, 2023

(54) GENERATING SOLUTION KEYWORD TAG CLOUDS BASED ON SUPPORT FORUM POST ANALYTICS

(71) Applicant: International Business Machines Corporation, Armonk, NY (US)

(72) Inventors: Ching-Wei Cheng, New Taipei (TW); Tzuching Kuo, Taipei (TW); June-Ray Lin, Taipei (TW); Yi Chun Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 16/776,910

(22) Filed: Jan. 30, 2020

(65) Prior Publication Data

US 2020/0167799 A1 May 28, 2020

Related U.S. Application Data

(63) Continuation of application No. 15/338,666, filed on Oct. 31, 2016, now Pat. No. 10,636,038.

(51) Int. Cl.
*G06F 16/901* (2019.01)
*G06Q 30/016* (2023.01)
(Continued)

(52) U.S. Cl.
CPC ...... *G06F 16/9027* (2019.01); *G06F 16/2246* (2019.01); *G06N 5/02* (2013.01); *G06Q 30/016* (2013.01)

(58) Field of Classification Search
CPC ............ G06F 16/2246; G06F 16/9027; G06F 3/0482; G06F 9/451; G06Q 10/10;
(Continued)

(56) References Cited

U.S. PATENT DOCUMENTS 7,890,318 B2    2/2011  Castellani et al.
9,092,314 B2 *  7/2015  Roy .................... G06F 11/0766
(Continued)

FOREIGN PATENT DOCUMENTS

WO     WO2014005657 A1    1/2014

OTHER PUBLICATIONS

List of IBM Patent or Patent Applications Treated as Related, dated Jan. 30, 2020, 2 pages.
(Continued)

*Primary Examiner* — Miranda M Huang
*Assistant Examiner* — Chase P. Hinckley
(74) *Attorney, Agent, or Firm* — Yee & Associates, P.C.

(57) ABSTRACT

Generating a solution keyword tag cloud is provided. The solution keyword tag cloud is generated for a product based on matching keywords identified in a question asking how to resolve an issue experienced by a user with the product with keyword tags included in a set of condition-solution trees corresponding to the product. In response to receiving an indication that a tried solution in the solution keyword tag cloud did not resolve the issue experienced by the user, the solution keyword tag cloud is graphically updated by moving the tried solution that failed to resolve the issue from a solution section of the solution keyword tag cloud to a condition section of the solution keyword tag cloud. The solution keyword tag cloud is presented in a graphical user interface display on a client device corresponding to the user.

21 Claims, 14 Drawing Sheets

(51) Int. Cl.
*G06N 5/02* (2023.01)
*G06F 16/22* (2019.01)

(58) Field of Classification Search
CPC ........ G06Q 10/06; G06N 20/00; G06N 5/003; G06N 7/005; G06N 5/02; H04L 41/22
See application file for complete search history.

(56) References Cited

U.S. PATENT DOCUMENTS

| | | | |
|---|---|---|---|
| 9,621,601 B2 | 4/2017 | Johnson, Jr | |
| 9,672,252 B2* | 6/2017 | Landry | G06F 16/24578 |
| 2001/0055017 A1* | 12/2001 | Ording | G06F 3/0481 |
| | | | 345/440 |
| 2005/0015644 A1 | 1/2005 | Chu et al. | |
| 2008/0172421 A1 | 7/2008 | Birnbaum | |
| 2010/0299326 A1 | 11/2010 | Germaise | |
| 2014/0068330 A1* | 3/2014 | Hecox | G06F 11/0706 |
| | | | 714/26 |
| 2014/0337257 A1 | 11/2014 | Manjirnath et al. | |
| 2015/0161512 A1 | 6/2015 | Byron et al. | |
| 2015/0254230 A1 | 9/2015 | Alkis et al. | |
| 2015/0356142 A1* | 12/2015 | Proux | G06F 16/334 |
| | | | 706/11 |
| 2016/0335261 A1 | 11/2016 | Salvetti | |
| 2017/0213303 A1* | 7/2017 | Papadopoulos | G06F 16/24578 |
| 2018/0121929 A1 | 5/2018 | Cheng et al. | |

OTHER PUBLICATIONS

Office Action, dated Jun. 26, 2019, regarding U.S. Appl. No. 15/338,666, 29 pages.
Final Office Action, dated Oct. 28, 2019, regarding U.S. Appl. No. 15/338,666, 23 pages.
Notice of Allowance, dated Dec. 19, 2019, regarding U.S. Appl. No. 15/338,666, 9 pages.

* cited by examiner

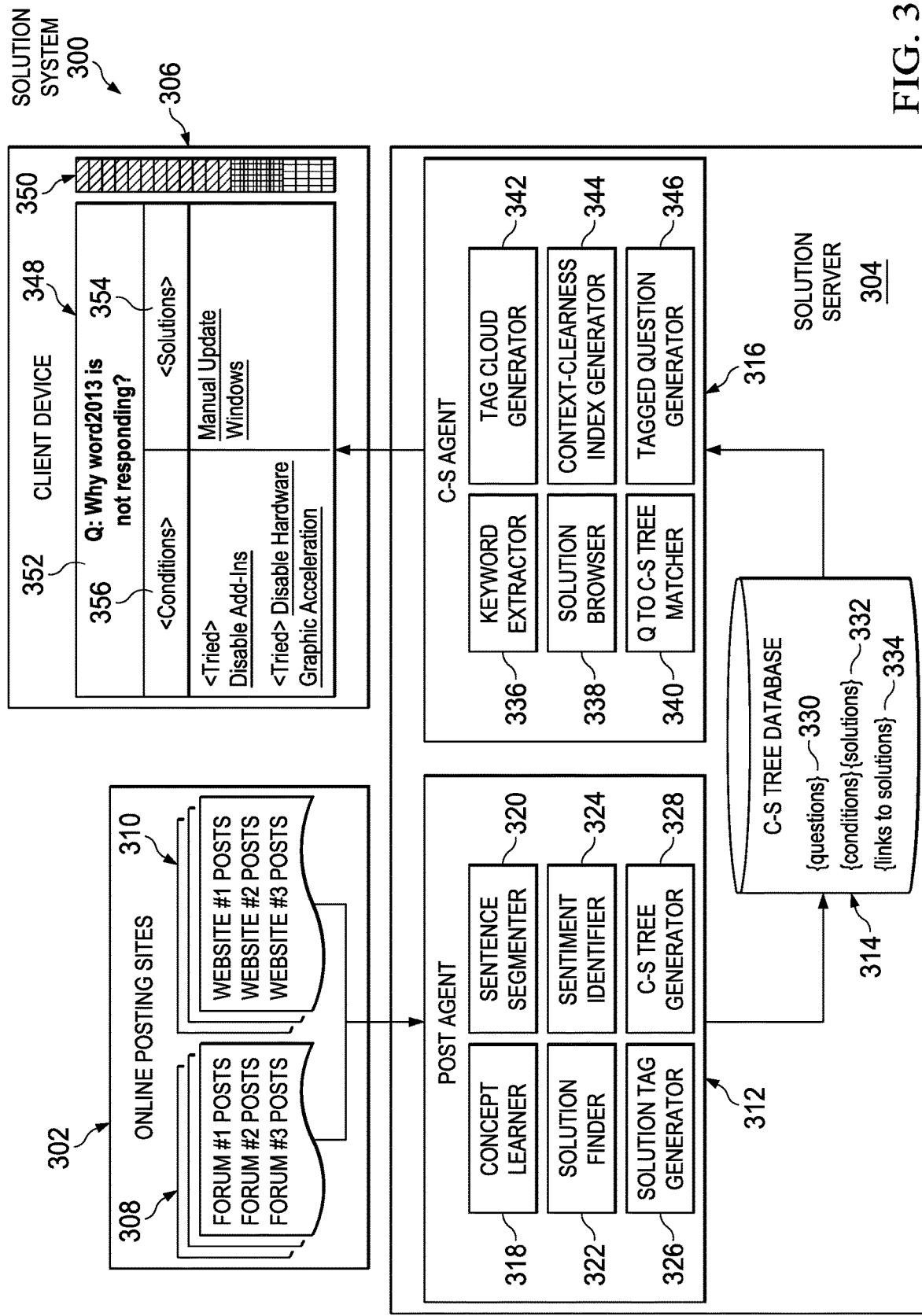

ONLINE POST 400

StackOverflowError on simple coach.

Oct 10, 2011 | Tags: *none*

Hi,

I think I'm having issues with some kind of bug or Coach Transformation definitions. I was trying to run some service that has been working, but now I'm getting a java.lang.StackOverflowError. I tried to reduce the error to the minimum coach possible and ended up with a coach with two private variables (both lists). I'm using NameValuePair lists, but I've tried with custom variables and the error is the same.

So, the coach has two tables, each one binded to a variable (tw.object.listOf.NameValuePair). Both variables have been initialized and have elements in it. If I remove one of the tables at a time, I can see the remaining table, with correct values, but when I have both tables, I'm getting that StackOverflowError.

I went for the logs and I did find some huge stack at the function com.ibm.xtq.xml.xdm.ref.XDMForwardPositionCursor.cloneXDMCursor. The first call is made on the Coach transformation sub-function calculateBindingValue_rhs. The log screenshot is attached on this post.

The error comes in the xsl transformation, but I haven't changed the default XSL. Just to try it, I used a copy of the default XSL on the test coach, but the error remained.

Do you know what can be causing this? It's kind of a major problem to get our real coaches to work.

Thank you,
pgf

TITLE 402
PROBLEM 406
404 BODY
408 QUESTION

FIG. 4

SEGMENTED
SENTENCES
600

SENTENCE 602
- I saw a similar error in 7.2 anytime I had two coaches, each with a table, in the same service
- Positive? -2
- About you? false
- Type: DECLARATIVE SENTENCE 604
- Another person saw it with two tables in one coach
- Positive? 0
- About you? false
- Type: DECLARATIVE SENTENCE 606
- In the end, it turned out that this only occurred when Debug mode was enabled on WAS
- Positive? 0
- About you? false
- Type: DECLARATIVE SENTENCE 608
- Go to your WAS Admin console and check: Application servers > app_server_name > Process definition > Java Virtual Machine > Debug Mode   ⎫ 616
- Positive? 0  ~618
- About you? true
- Type: COMMAND  ~614
- Solution: Go to your WAS Admin console and check : Application servers > app_server_name > Process definition > Java Virtual Machine > Debug Mode

SENTENCE 610
- That was it. It works without Debug Mode enabled. Thanks
- Positive? 2
- About you? false
- Type: DECLARATIVE SENTENCE 612
- Forgot to mention it before but, for future reference, the issue was happening on a 7.5.0.1 IBM BPM and 7.0.0.19 WAS
- Positive? 0
- About you? false
- Type: DECLARATIVE

FIG. 6

› Re: StackOverflowError on simple coach.

› SystemAdmin Oct 11, 2011

› I saw a similar error in 7.2 anytime I had two coaches, each with a table, in the same service. Another person saw it with two tables in one coach.

› In the end, it turned out that this only occurred when Debug mode was enabled on WAS. Go to your WAS Admin console and check:

› Application servers > app_server_name > Process definition > Java Virtual Machine > Debug Mode

ANSWER 704

We're getting this error when "Debug Mode" is set to "false" (although the server is under load). I wonder if Debug Mode just exacerbates the problem. We're on v7.2 FP4 and the problem does seem restricted to Coaches with two Tables on.

702 OTHER RESPONSE POST

FIG. 7

OTHER RESPONSE
POST SENTIMENTS
800

```
We're getting this error when "Debug Mode" is set to "false" (although the server is under load)
Positive? -2   802
About you? false
Type: DECLARATIVE I wonder if Debug Mode just exacerbates the problem
Positive? -2   804
About you? false
Type: DECLARATIVE We're on v7.2 FP4 and the problem does seem restricted to Coaches with two Tables on
Positive? -4   806
About you? false
Type: DECLARATIVE
```

FIG. 8

```
                                                              SOLUTION
                                                              COMMAND
Go to your WAS Admin console and check : Application servers >   SENTENCE
app_server_name > Process definition > Java Virtual Machine > Debug Mode   902

⇒  WAS Admin, Application Servers, Process definition, Java Virtual Machine,
   Debug Mode   904
            COMPACT SOLUTION
            KEYWORD TAG
```

FIG. 9

GENERATING SOLUTION KEYWORD TAG CLOUDS BASED ON SUPPORT FORUM POST ANALYTICS

BACKGROUND

1. Field

The disclosure relates generally to finding solutions and more specifically to automatically generating a solution keyword tag cloud with solution context-clearness index based on analyzing online posts, which correspond to an issue or problem experienced by a registered user with a product or service, in a support form corresponding to the product or service.

2. Description of the Related Art

No matter how good a software product or service is customers always raise issues or problems experienced by the customers at runtime. Typically, an online support forum for the product or service is crowded with posts. In addition, some posts in the support forum are not very helpful, such as "My app is not responding! Help", which does not provide any specific information (e.g., name of the application not responding, version of the application, type of issue experienced by the customer, type of platform used to run the application, et cetera). As a result, a customer may experience difficulty in finding a correct solution to the customer's particular issue by reading posts within the support forum. Consequently, the customer may spend a lot of time trying to find a golden solution in a pile of black sand posts. Further, these difficulties repeat for each release, version, or patch of a product or service. Thus, companies may be required to increase costs by having to utilize more support personnel to assist customers experiencing these issues or problems with their products or services.

One current technique is social tagging of posts to help ease the pain of searching for solutions to an issue or problem. For example, a person may manually tag a post with meaningful keywords, such as "Alert Data Format" or "Agent communication". Another current technique of assisting in searching for solutions is computer tagging of posts. For example, a computer may automatically tag a post with simple keywords, which may be helpful, but are less meaningful, such as "alerts", "agents", and "communications". However, these current techniques of social and computer tagging of posts do not solve the customer's problem of having to sift through and read a large number of tagged posts, which may not contain any helpful information, in the hope of finding a possible solution to the issue or problem experienced by the customer.

SUMMARY

According to one illustrative embodiment, a computer-implemented method for generating a solution keyword tag cloud is provided. A computer generates the solution keyword tag cloud for a product based on matching keywords identified in a question asking how to resolve an issue experienced by a user with the product with keyword tags included in a set of condition-solution trees corresponding to the product, wherein the solution keyword tag cloud is a text box including a question section that contains the question asking how to resolve the issue, a solution section that contains a set of solutions not yet tried for resolving the issue, and a condition section that contains tried solutions failing to resolve the issue. In response to the computer receiving an indication that a tried solution in the solution keyword tag cloud did not resolve the issue experienced by the user, the computer graphically updates the solution keyword tag cloud by moving the tried solution that failed to resolve the issue from the solution section of the solution keyword tag cloud to the condition section of the solution keyword tag cloud. The computer presents the solution keyword tag cloud in a graphical user interface display on a client device corresponding to the user. Thus, the computer guides the user, via a set of solution keyword tag interactions, to find a technical solution to the issue experienced by the user with the product. In addition, the computer accelerates the speed of solution identification.

The computer orders solutions in a solution section of the solution keyword tag cloud based on at least one of a success rate of a particular solution and a level of risk associated with the particular solution to resolve the issue experienced by the user to form an ordered list of solutions. The ordered list of solutions allows the user to select first the solution within the list with the highest rate of success and/or the least level of risk associated with using that particular solution. The computer also generates a solution context-clearness index for the product that allows the user to graphically visualize how close the user is to approaching a last solution for the issue with the product based on at least one of a sum of a total number of possible solutions and a sum of a total number of further solution branches in the solution keyword tag cloud. The solution context-clearness index allows the user to graphically visualize how close the user is to finding the technical solution to the issue experienced by the user with the product. By updating the solution keyword tag cloud and solution context-clearness index as solutions are tried without resolving the issue, the computer continuously organizes tried and untried solutions for the user, lets the user know how far the user has come in resolving the issue, and informs the user as to how close the user is to finding the correct technical solution to the issue.

In response to the computer determining that all solutions in the solution keyword tag cloud have been tried without resolving the issue, the computer automatically generates a tagged question with context information regarding the issue experienced by the user and posts the tagged question in an online posting site. The tagged question includes the question originally submitted by the user, all previously tried solutions that failed to resolve the issue experienced by the user with the product, and a question asking for more suggestions on how to resolve the issue. Thus, the computer automatically provides support for the user when no technical solution was found to resolve the issue. According to other illustrative embodiments, a computer system and computer program product for generating a solution keyword tag cloud are provided.

BRIEF DESCRIPTION OF THE DRAWINGS

FIG. 3 is a diagram illustrating an example of a solution system in which illustrative embodiments may be implemented;

FIG. 4 is an example of an online post in accordance with an illustrative embodiment;

FIG. 6 is an example of segmented sentences in accordance with an illustrative embodiment;

FIG. 7 is an example of another response post in accordance with an illustrative embodiment;

FIG. 8 is an example of other response post sentiments in accordance with an illustrative embodiment;

FIG. 9 is an example of a compact solution keyword tag in accordance with an illustrative embodiment;

DETAILED DESCRIPTION

Figure 1:
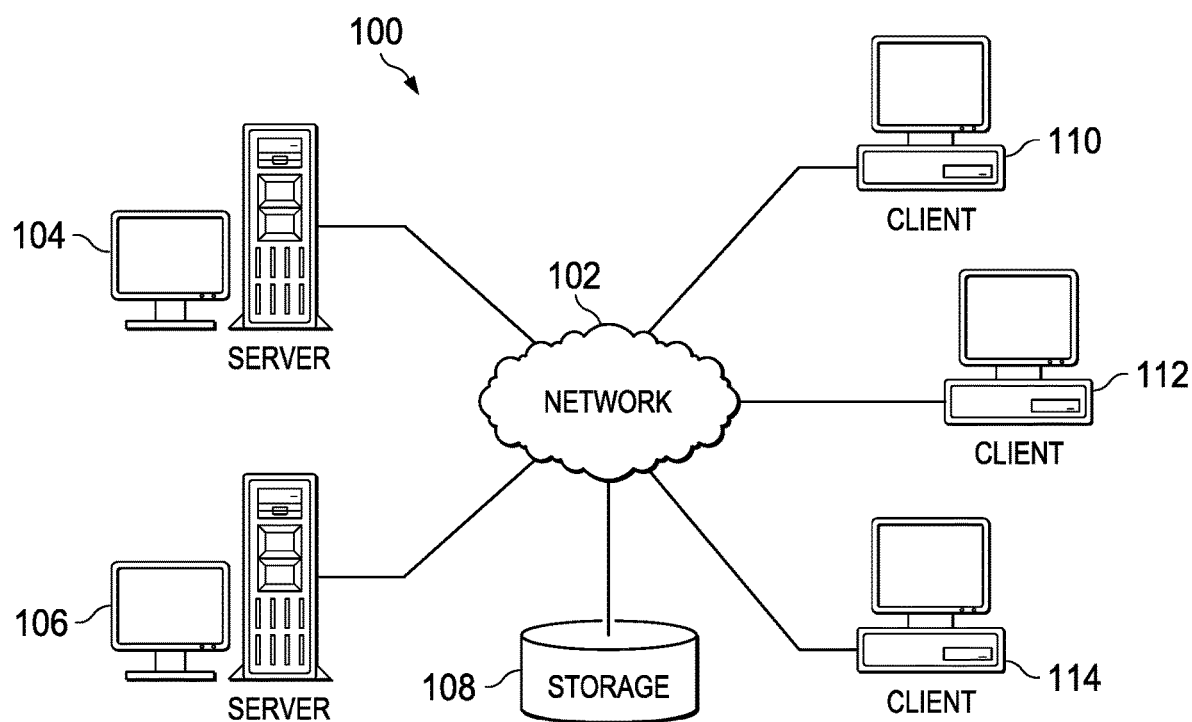
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
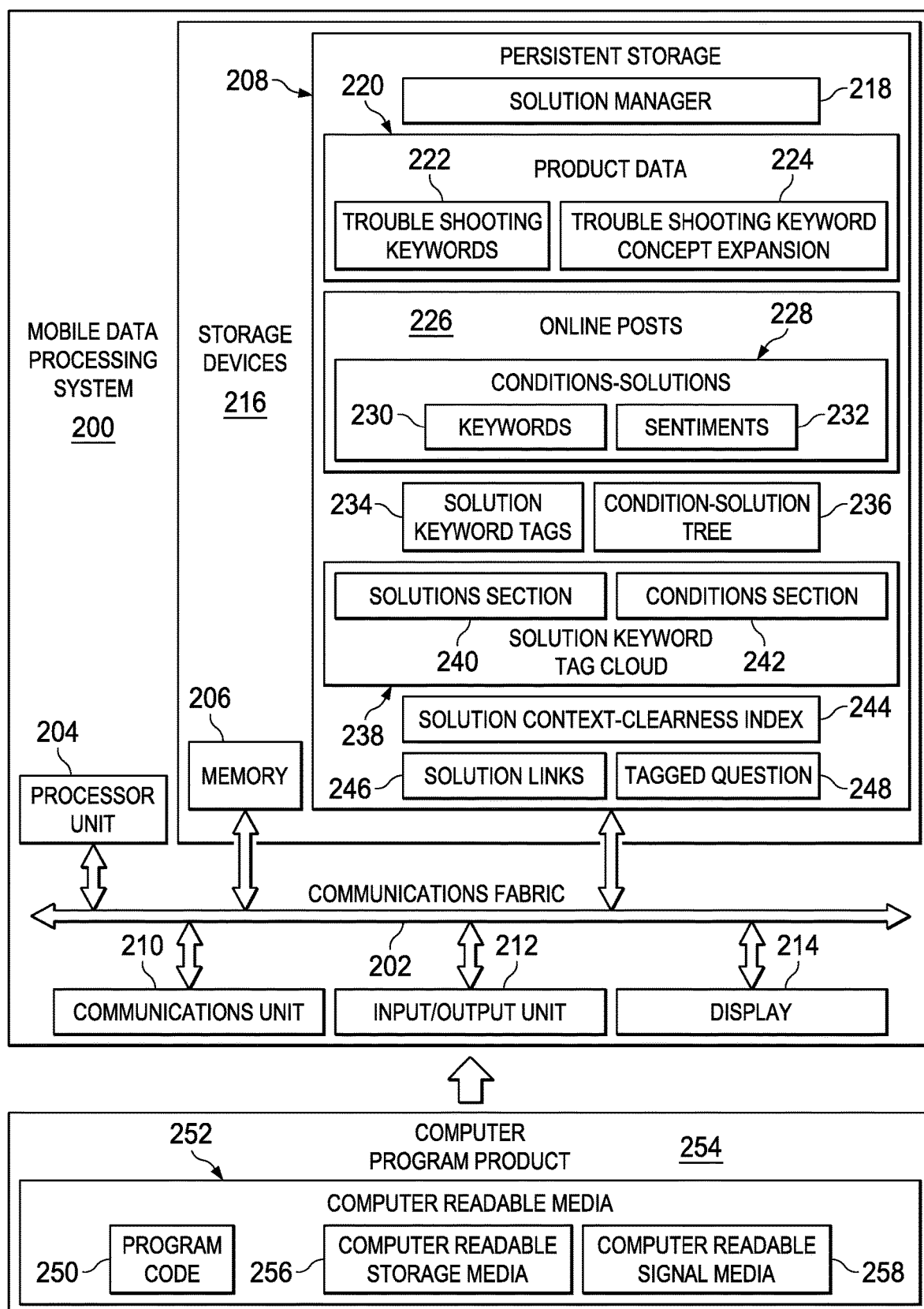
FIG. 2 is a diagram of a data processing system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 and server 106 may provide a set of one or more solution tag cloud generating services to registered users of client devices connected to network 102. For example, server 104 or server 106 may automatically generate a solution keyword tag cloud, which a registered user may utilize to resolve an issue or problem with a product or service used by the user, in response to the user submitting a question regarding the issue or problem to server 104 or server 106. Also, it should be noted that each of server 104 and server 106 may represent a plurality of servers providing a plurality of solution finding services.

It should be noted that as used herein, a "set of" items is defined as one or more items. Also as used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination of items and number of items may be used from the list, but not all of the items in the list are required.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, laptop computers, handheld computers, smart phones, smart watches, personal digital assistants, gaming devices, kiosks, set top boxes, and the like. Registered users of clients 110, 112, and 114 may utilize clients 110, 112, and 114 to access the solution tag cloud generating services provided by server 104 and server 106.

Storage 108 is a network storage device capable of storing any type of data in a structured format or an unstructured format. In addition, storage 108 may represent a set of one or more network storage devices. Storage 108 may store, for example, names and identification numbers for a plurality of different registered users; identification of a plurality of different client devices corresponding to the registered users; user questions regarding issues or problems experienced by the registered users with different products or services; online posts regarding a plurality of different products and services; condition-solution trees containing solution keyword tags; solution context-clearness indices; solution keyword tag clouds; links to solution information; and the like. Further, storage 108 may store other data, such as authentication or credential data that may include user names, passwords, and biometric data associated with the plurality of different registered users and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores solution manager 218. Solution manager 218 analyzes posts, which correspond to an issue or problem experienced by users of a product or service, within one or more online posting sites, such as, for example, a set of one or more support forms corresponding to the product or service, a set of one or more websites hosted by a company providing the product or service, and/or a set of one or more social media websites. Based on the analysis of the online posts, solution manager 218 automatically generates solution keyword tag clouds with solution context-clearness indices to guide users experiencing issues or problems with the product or service to a correct technical solution for resolving the particular issues or problems experienced by the different users. If solution manager 218 does not find a correct solution to resolve a particular issue or problem, solution manager 218 automatically generates a tagged question with full context information regarding the issue or problem and posts the tagged question on the one or more online posting sites for stimulating further answer response posts regarding the issue or problem. It should be noted that even though solution manager 218 is illustrated as residing in persistent storage 208, in an alternative illustrative embodiment solution manager 218 may be a separate component of data processing system 200. For example, solution manager 218 may be a hardware component coupled to communication fabric 202 or a combination of hardware and software components.

Solution manager 218 retrieves product data 220 from one or more storage databases, such as, for example, storage 108 in FIG. 1. Product data 220 are a set of one or more documents, such as, for example, specifications, literature, manuals, helpdesk reports, and the like, which correspond to a particular product or service. However, it should be noted that product data 220 may represent documents for a plurality of different products or services.

Solution manager 218 searches for trouble shooting keywords 222 within, for example, a trouble shooting section of product data 220. Trouble shooting keywords 222 represent different keywords found in product data 220 that correspond to issues or problems that may be experienced by users of the product or service corresponding to product data 220. After finding trouble shooting keywords 222 in product data 220, solution manager 218 performs trouble shooting keyword concept expansion 224 on trouble shooting keywords 222. Concept expansion analyzes text to generate a dictionary of contextually related words. In other words, solution manager 218 utilizes trouble shooting keyword concept expansion 224 to generate a list of contextually related words to trouble shooting keywords 222.

Subsequent to finding trouble shooting keywords 222 and performing trouble shooting keyword concept expansion 224, solution manager 218 analyzes online posts 226. Online posts 226 represent a plurality of different posts corresponding to an issue or problem experienced by users of a product or service within one or more online posting sites. Solution manager 218 may utilize, for example, natural language processing to analyze online posts 226. While analyzing online posts 226, solution manager 218 searches for conditions-solutions 228 based on trouble shooting keywords 222 and the list of contextually related words to trouble shooting keywords 222 discovered by solution manager 218 while performing trouble shooting keyword concept expansion 224. Conditions-solutions 228 represent a set of one or more conditions and solutions found in online posts 226. A condition in conditions-solutions 228 represents a particular solution to a particular issue or problem that was tried by a user and did not resolve the particular issue or problem experienced by that user. A solution in conditions-solutions 228 represents a particular solution to a particular issue or problem that was tried by a user and did resolve the particular issue or problem or is a particular solution to the particular issue or problem that has not been tried yet to resolve the particular issue or problem.

After finding conditions-solutions 228 in online posts 226, solution manager 218 identifies keywords 230 and sentiments 232 found in conditions-solutions 228. Keywords 230 represent "COMMAND" type keywords in conditions-solutions 228 corresponding to the product or service. Sentiments 232 represent sentiments expressed by different users regarding respective conditions and solutions identified in online posts 226. Sentiments 232 may include positive sentiments, such as, for example, happiness, elation, satisfaction, encouragement, and the like, and negative sentiments, such as, for example, frustration, anger, irritation, hopelessness, and the like.

Solution manager 218 generates solution keyword tags 234 based on keywords 230 found in conditions-solutions 228. Solutions keyword tags 234 represent a set of tags corresponding to the identified solution "COMMAND" type keywords. Further, solution manager 218 generates condition-solution tree 236 based on solution keyword tags 234 and corresponding sentiments identified in sentiments 232. Condition-solution tree 236 represents a tree structure of solution keyword tags and corresponding sentiments for identifying a solution or set of solutions to a particular issue or problem with the product or service.

Subsequent to generating condition-solution tree 236 for the product or service, solution manager 218 may receive a question from a registered user regarding a particular issue or problem experienced by the registered user with the product or service. Based on analyzing the particular issue or problem experienced by the registered user in the question, solution manager generates solution keyword tag cloud 238 using condition-solution tree 236 corresponding to the product or service. Solution keyword tag cloud 238 represents a cloud of solution keyword tags for guiding the registered user to a correct solution to resolve the particular issue or problem experienced by the registered user.

In this example, solution keyword tag cloud 238 includes solution section 240 and condition section 242. Solution section 240 contains a set of one or more solution keyword tags that the registered user can try to resolve the particular issue or problem. Solution manager 218 may arrange the solution keyword tags in solution section 240 by order of success rate of the different solutions and/or by order of level of risk associated with trying the different solutions. Condition section 242 contains solutions corresponding to solution keyword tags that were tried by the registered user, but failed to resolve the particular issue or problem that the registered user was experiencing.

Furthermore, solution manager 218 may generate solution context-clearness index 244 with solution keyword tag cloud 238. Solution context-clearness index 244 represents an index that indicates how close the registered user is to finding a correct solution to the particular issue or problem experienced by the registered user or how clearly the registered user understands the context of the solutions. Solution manager 218 may generate solution context-clearness index 244 based on number of possible solutions and/or number of possible further solution branching.

Moreover, solution manager 218 may generate solution links 246 and include solution links with solution keyword tag cloud 238. Solution links 246 represent a set of one or more links to websites containing information regarding the solutions represented in solution keyword tag cloud 238.

If the registered user does not find the correct solution to the particular issue or problem experienced by the registered user in solution keyword tag cloud 238, then solution manager 218 generates tagged question 248. Tagged question 248 represents a question with full context information regarding the particular issue or problem experienced by the registered user and solutions tried in solution keyword tag cloud 238 that failed to resolve the registered user's particular issue or problem with the product or service. In addition, solution manager 218 posts tagged question 248 on the one or more online posting sites to simulate answers to the question regarding the particular issue or problem.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A multitude of textual information exists in online posting sites regarding possible solutions to issues or problems with products. However, sometimes solutions posted online work and sometimes the posted solutions fail to resolve the issues or problems. In addition, the individual experiencing a particular issue or problem may have to spend hours or even days going through and reading all of the online posts to find a correct technical solution to resolve the particular issue or problem.

As an example, an individual may experience a problem with a network protection manager (NPM) showing an alert data error and posts a question online asking how to resolve the problem. Possible solutions posted online by others may include, for example: restart the NPM, which may include tons of textual information; run ADFMaint.exe, which also may include tons of textual information; disconnect agent and reconnect; et cetera. However, the individual may be pressed for time and may just want a simple diagnosis process, such as, for example, try "restart NPM", if still not working, try "ADFMaint", if still not working, try . . . .

Illustrative embodiments automate support forum analytics and present a self-service solution portal, speeding up the issue-resolving cycle. Illustrative embodiments read and analyze online posts regarding issues and problems corresponding to products or services, summarize the online posts into a set of compact solution keyword tags so that a registered user can try the set of compact solution keyword tags in the correct order, such as based on success rate or level of associated risk.

First, illustrative embodiments learn the trouble shooting keywords corresponding to a particular product or service domain, such as, for example, the network protection manager (NPM) domain. Second, illustrative embodiments scan all online posts and/or articles to find "command" or "imperative" statements containing trouble shooting keywords corresponding to the particular product or service that direct a registered user to perform an action in order to resolve the problem (e.g., "go to file menu and restart NPM"). Third, based on the trouble shooting keywords identified in the first step above, illustrative embodiments eliminate frequently-used keywords in the statements found in the second step above, to generate a compact solution statement of infrequently-used keywords. Then, illustrative embodiments tag the online posts with the compact solution statement of infrequently-used keywords (e.g., "go to . . . , and restart . . . " becomes "restart your NPM" in short, assuming most solutions mention "file menu", therefore it's neither critical nor identical). Fourth, illustrative embodiments analyze sentiments in the online posts using natural language processing to know how people feel about the different posted solutions. For example, illustrative embodiments analyze the sentiments to determine whether particular solutions are working for others to resolve their issues so that illustrative embodiments may present the compact or shortened solution statements in order of success rate.

Based on support forum post analytics, illustrative embodiments present a solution keyword tag cloud with solution context-clearness index to registered users so that the registered users can quickly diagnose their issues and find correct solutions. Moving a cursor over a particular solution keyword tag in the solution keyword tag cloud reveals more details regarding that particular solution and may even take a registered user to the original corresponding online post if needed by the registered user. The solution context-clearness index indicates how close the registered user is to approaching the final or last solution. If no correct solution exists, illustrative embodiments generate and post a tagged question with full context information in the support forum. The posted, tagged question allows others visiting the support forum to know how far the registered user had gotten in terms of resolving the particular issue and to provide help to the registered user from that point.

Illustrative embodiments perform periodic concept expansion of trouble shooting keywords found in a trouble shooting section of manuals, documents, specifications, or literature corresponding to a product or service. Illustrative embodiments perform this periodic concept expansion of trouble shooting keywords to learn other product terms, such as, for example, "debug mode" and "graphics accelerator", to understand the semantics and context of the trouble shooting keywords.

Illustrative embodiments analyze the latest unchecked online posts based on the concept expansion of the trouble shooting keywords corresponding to the product. Further, illustrative embodiments identify conditions and solutions to questions in the online posts and identify keywords as tags from conditions and solutions. Furthermore, illustrative embodiments identify sentiments in the online posts. Then, illustrative embodiments generate a condition-solution tree for the product based on solution keyword tags and sentiments and also generate a solution context-clearness index.

In addition, illustrative embodiments identify keywords in a question submitted by a registered user regarding an issue with the product. Illustrative embodiments match the identified keywords in the question to the condition-solution tree corresponding to the product. Based on the matching, illustrative embodiments display a solution keyword tag cloud on a client device corresponding to the registered user. Moreover, illustrative embodiment change solution keyword tags in the solution keyword tag cloud and the solution context-clearness index based on user selection of tags in the solution keyword tag cloud until a correct solution is found. When no correct solution is found to resolve the registered user's issue with the product, illustrative embodiments generate a tagged question with full context information and post the tagged question online in the support forum for a response.

Support forum posts show a journey to find possible solutions to issues or problems. However, the forum posts are generally context-poor, open-ended questions. Illustrative embodiments read a post and understand not just the post's meaning, but also the journey and expressed sentiments regarding intermediate outputs, and summarize a full-text comprehensive solution into a compact solution tag with few words. Thus, illustrative embodiments guide registered users, via a set of solution keyword tag interactions and a solution context-clearness index, to find a correct technical solution to a particular issue or problem.

Thus, illustrative embodiments accelerate the speed of solution identification by automatically learning from new online posts. In addition, illustrative embodiments allow registered users to clearly know how far the users have gone and how likely the users are to finding correct solutions to problems with products or services. Further, illustrative embodiments make support for the registered users easier by generating tagged questions when no solution is found. Consequently, illustrative embodiments may reduce a three hour support forum reading time for an individual to a three minute quick diagnosis process.

With reference now to FIG. 3, a diagram illustrating an example of a solution system is depicted in which illustrative embodiments may be implemented. Solution system 300 is a system of hardware and software components for automatically generating solution keyword tag clouds that guide registered users to correct solutions to resolve issues experienced by the registered users with products or services. Solution system 300 may be implemented in a network of data processing systems, such as, for example, network data processing system 100 in FIG. 1.

In this example, solution system 300 includes online posting sites 302, solution server 304, and client device 306. However, it should be noted that solution system 300 is only intended as an example and not as a limitation on different illustrative embodiments. In other words, solution system 300 may include any number of online positing sites, solution servers, and client devices and also may include other devices not shown.

Online posting sites 302 represent a plurality of different online sites where individuals may post questions and answers regarding issues or problems that the individuals are experiencing with products and/or services. In this example, online posting sites 302 include support forum posting sites 308 and website posting sites 310. However, online posting sites 302 may include other types of posting sites, such as, for example, social media sites.

Solution server 304 automatically generating a solution keyword tag cloud with a solution context-clearness index based on analyzing online posts, which correspond to an issue or problem experienced by a registered user with a product or service, posted on one or more of online posting sites 302. Solution server 304 may be, for example, server 104 in FIG. 1 or data processing system 200 in FIG. 2. In this example, solution server 304 includes post agent 312, condition-solution (C-S) tree database 314, and C-S agent 316.

Post agent 312 performs: concept expansion of trouble shooting keywords corresponding to products or services; semantic analysis of answer posts found in online posting sites 302 to identify command or imperative sentences as possible solutions; and infrequent keyword identification to generate compact solution keyword tags and sentiment identification to generate condition-solution trees from reply answers to questions regarding issues or problems with the products or services. In this example, post agent 312 includes concept learner 318, sentence segmenter 320, solution finder 322, sentiment identifier 324, solution tag generator 326, and C-S tree generator 328.

Post agent 312 utilizes concept learner 318 to perform the concept expansion of the trouble shooting keywords to identify and learn other words contextually related to the trouble shooting keywords. Post agent 312 utilizes sentence segmenter 320 to segment sentences contained within the different online posts. Post agent 312 utilizes solution finder 322 to identify command or imperative sentences as solutions within the segmented sentences. Post agent 312 utilizes sentiment identifier 324 to identify expressed sentiments within the segmented sentences and apply a sentiment value to each identified sentiment corresponding to a sentence. Post agent 312 utilizes solution tag generator 326 to generate solution keyword tags for identified solution sentences. Post agent 312 utilizes C-S tree generator to generate a condition-solution tree structure for a product or service based on the generated solution keyword tags and corresponding sentiments.

Solution server 304 utilizes C-S tree database 314 to store the condition-solution tree structures, which are updated by post agent 312 whenever new online posts arrive, and to automatically apply new production versions with troubleshooting keywords for new product document releases. In this example, C-S tree database 314 also stores questions 330, conditions-solutions 332, and links to solutions 334. Questions 330 represent questions submitted by registered users regarding issues or problems experienced by the registered user with products and/or services. Conditions-solutions 332 represent conditions and solutions identified by solution finder 322 in the online posts corresponding to the products and/or services. Conditions-solutions 332 may be, for example, conditions-solutions 228 in FIG. 2. Links to solutions 334 represent links to websites that contain information regarding corresponding solutions. Links to solutions 334 may be, for example, solution links 246 in FIG. 2.

C-S agent 316 performs keyword matching to locate a set of one or more candidate condition-solution trees corresponding to a particular product or service, generates a solution section of a solution keyword tag cloud to present high-success-rate and/or low-risk compact solution keyword tags and a condition section of the solution keyword tag cloud to show tried solution tags that failed to resolve the particular issue or problem, and posts a tagged question with full context information post to the product support forum if no solution was found. In this example, C-S agent 316 includes keyword extractor 336, solution browser 338, question (Q) to C-S tree matcher 340, tag cloud generator 342, context-clearness index generator 344, and tagged question generator 346.

C-S agent 316 utilizes keyword extractor 336 to identify keywords in questions submitted by registered users regarding issues or problems experienced by the registered users with a product or service. C-S agent 316 utilizes solution browser 338 to search for information corresponding to links to solutions 334. C-S agent 316 utilizes Q to C-S tree matcher 340 to match identified keywords in questions to a set of condition-solution trees corresponding to the product or service a registered user is experiencing a problem with. C-S agent 316 utilizes tag cloud generator 342 to generate solution keyword tag cloud 348 based on matching solution keyword tags in the set of condition-solution trees with the keywords identified in a question regarding a particular issue or problem. Solution keyword tag cloud 348 may be, for example, solution keyword tag cloud 238 in FIG. 2. C-S agent 316 utilizes context-clearness index generator 344 to generate solution context-clearness index 350 that indicates how close a registered user is to finding a correct solution to a problem experienced by that registered user with a product or service. Solution context-clearness index 350 may be, for example, solution context-clearness index 244 in FIG. 2. C-S agent 316 utilizes tagged question generator 346 to generate and post a tagged question with full context information when no solution in the solution keyword tag cloud resolves the registered user's problem with the product or service. The tagged question may be, for example, tagged question 248 in FIG. 2.

After C-S agent 316 generates solution keyword tag cloud 348, solution server 304 displays solution keyword tag cloud 348 on client device 306. Client device 306 may be, for example, client 110 in FIG. 1. In this example, solution keyword tag cloud 348 not only includes solution context-clearness index 350, but also includes question 352, solutions section 354 and conditions section 356, such as solution section 240 and condition section 242 in FIG. 2. Question 352 represents the question submitted by the registered user regarding the particular issue the registered user is experiencing with a product. In this example, solutions section 354 contains one last solution that the registered user has not yet tried to resolve the issue experienced by the registered user. Conditions section 356 contains two solutions that the registered user has previously tried without resolving the issue.

With reference now to FIG. 4, an example of an online post is depicted in accordance with an illustrative embodiment. Online post 400 is an example of a post on an online posting site, such as, for example, one of online posting sites 302 in FIG. 3. In this example, online post 400 includes title 402 and body 404. Title 402 represents the subject matter related to online post 400. Illustrative embodiments may use title 402 as text for a root node in a condition-solution tree, such as condition-solution tree 236 in FIG. 2. In addition, illustrative embodiments may eliminate frequently-used words, such as, for example, "the", "to", "a", "what", "why", "where", "on", and the like, from the title of a post to generate the text for the root node. Body 404 represents the body of textual information related to title 402 of online post 400. Body 404 includes problem 406 and question 408. Problem 406 represents text regarding a particular problem an individual is experiencing with a particular product. Question 408 represents text asking what is causing this particular problem or how to resolve this problem. Illustrative embodiments may generate a full condition-solution tree from title 402 and body 404. Further, illustrative embodiments may associate the generated condition-solution tree with other stored condition-solution trees in a C-S tree database, such as C-S tree database 314 in FIG. 3, to form a set of condition-solution tree that correspond to a particular question or problem regarding a product. Furthermore, if an online post only includes a title with no body, illustrative embodiments may match the title of the post with text of root nodes of stored condition-solution trees to find possible solutions to the problem corresponding to the title of the post.

Figure 5:
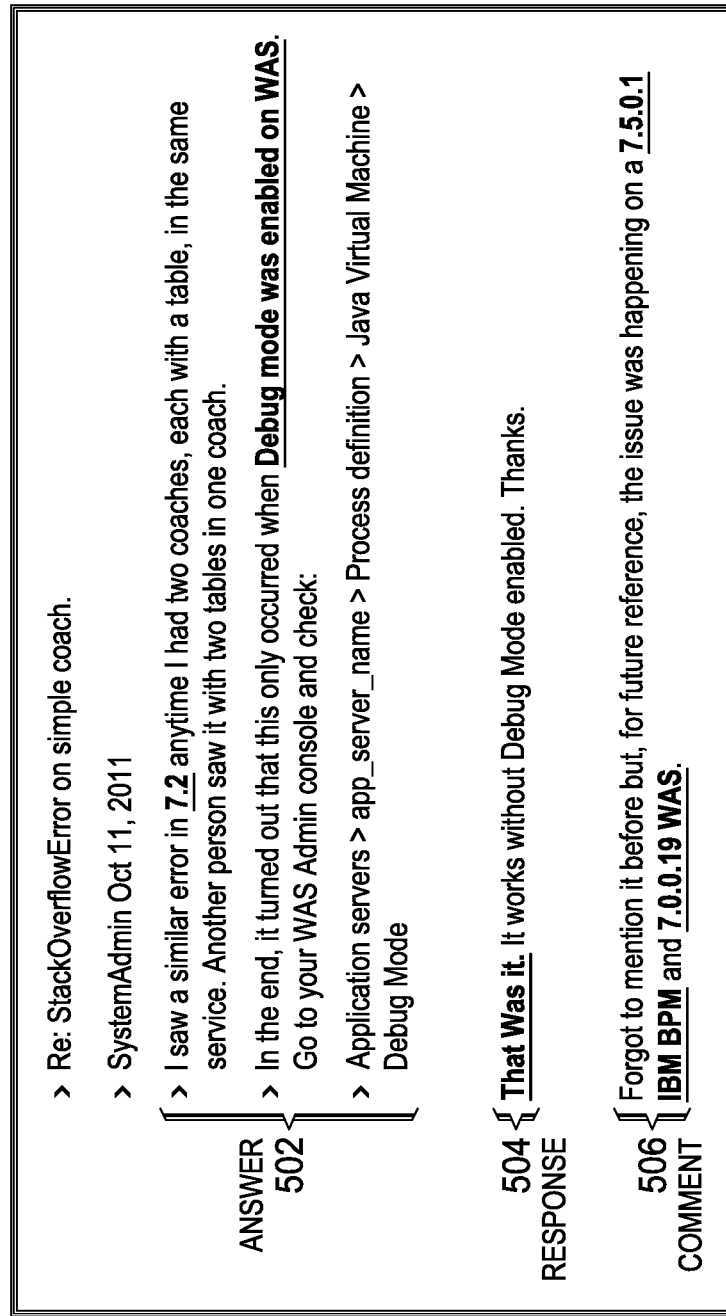
FIG. 5 is an example of response posts in accordance with an illustrative embodiment.

With reference now to FIG. 5, an example of response posts is depicted in accordance with an illustrative embodiment. Response posts 500 are examples of different responses to a question in an online post, such as question 408 in online post 400 in FIG. 4. In this example, response posts 500 include answer 502, response 504, and comment 506. Answer 502 represents text from a person instructing the individual that posted the question to try a particular solution to resolve the issue. Response 504 represents text from the individual that posted the question indicating that the solution in posted answer 502 resolved the issue experienced by the individual. Comment 506 represents further text from the person that posted answer 502 regarding other products that may have the same issue.

With reference now to FIG. 6, an example of segmented sentences is depicted in accordance with an illustrative embodiment. Segmented sentences 600 represent a plurality of sentences that are segmented or separated from one another for analysis by illustrative embodiments. Illustrative embodiments may utilize a sentence segmenter, such as sentence segmenter 320 in FIG. 3, to segment or separate sentences in posts for analysis. Segmented sentences 600 may be from, for example, response posts, such as response posts 500 in FIG. 5. In this example, segmented sentences 600 include sentence 602, sentence 604, sentence 606, sentence 608, sentence 610, and sentence 612.

Illustrative embodiments may utilize a solution finder, such as solution finder 322 in FIG. 3, to analyze segmented sentences 600 and identify command or imperative sentences in segmented sentences 600. The solution finder may utilize, for example, natural language processing to analyze segmented sentences 600 and identify command or imperative sentences. In this example, the solution finder identifies sentence 608 as a command sentence as indicated by "COMMAND" 614. As a result, the solution finder identifies sentence 608 as a possible solution as indicated by "Solution" 616. In addition, illustrative embodiments may utilize a sentiment identifier, such as sentiment identifier 324 in FIG. 3, to analyze segmented sentences 600 and identify sentiments associated with each segmented sentence. In this example, the sentiment identifier identifies a sentiment value of zero for sentence 608 as indicated at 618.

From the identified command sentence, illustrative embodiments eliminate frequently-used keywords so that unique domain keywords emerge (i.e., infrequently-used keywords). Thus, illustrative embodiments generate a compact or shortened solution keyword tag from answer text (i.e., sentence 608) corresponding to a posted question regarding the issue with the product. A registered user can always expand a compact or shortened solution keyword tag, such as "debug mode" to show the original full command sentence or to show all of the text posted with the command sentence if needed.

With reference now to FIG. 7, an example of another response post is depicted in accordance with an illustrative embodiment. Other response post 702 represents text posted by another person in response to answer 704, which was posted in response to a posted question regarding an issue with a product, such as question 408 in FIG. 4. Answer 704 may be, for example, answer 502 in FIG. 5.

With reference now to FIG. 8, an example of other response post sentiments is depicted in accordance with an illustrative embodiment. Other response post sentiments 800 represent sentiments expressed by another person in a response post to an original answer to a question, such as, for example, other response post 702 in FIG. 7. In this example, other response post sentiments 800 include sentiment 802, sentiment 804, and sentiment 806.

Sentiment 802 and sentiment 804 are negative 2 and sentiment 806 is negative 4. Illustrative embodiments may utilize, for example, a natural language processing analysis of sentiments in posts to determine whether a particular solution, such as check "debug mode", is a good solution or not (e.g., negative sentiment scores indicate that a solution may not be a good solution for a particular problem).

With reference now to FIG. 9, an example of a compact solution keyword tag is depicted in accordance with an illustrative embodiment. Solution command sentence 902 may be, for example, solution 616 in FIG. 6. Illustrative embodiments generate compact solution keyword tag 904 from solution command sentence 902 by removing the frequently-used keywords to leave the infrequently-used keyword "Debug Mode".

Figure 10:
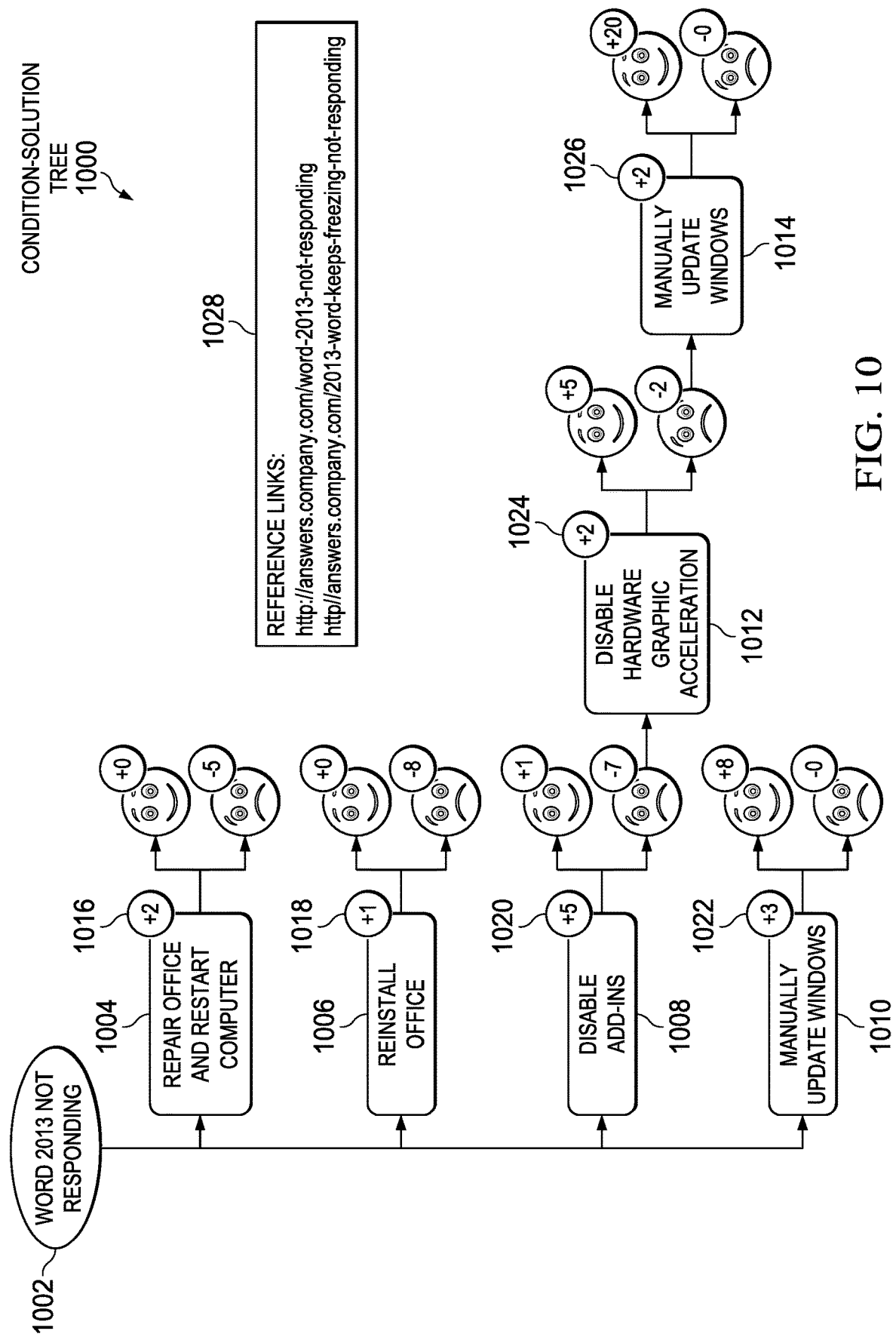
FIG. 10 is a diagram illustrating an example of a condition-solution tree structure in accordance with an illustrative embodiment.

With reference now to FIG. 10, a diagram illustrating an example of a condition-solution tree structure is depicted in accordance with an illustrative embodiment. Condition-solution tree 1000 may be, for example, condition-solution tree 236 in FIG. 2. In this example, condition-solution tree 1000 includes question 1002, compact solution keyword tag 1004, compact solution keyword tag 1006, compact solution keyword tag 1008, compact solution keyword tag 1010, compact solution keyword tag 1012, and compact solution keyword tag 1014. Question 1002 is a root node of condition-solution tree 1000 and compact solution keyword tag 1004, compact solution keyword tag 1006, compact solution keyword tag 1008, compact solution keyword tag 1010, compact solution keyword tag 1012, and compact solution keyword tag 1014 are leaf nodes.

Question 1002 corresponds to a title of an online post that is related to an original question regarding a problem with a product corresponding to condition-solution tree 1000. Illustrative embodiments may, for example, eliminate frequently-used words from question 1002. Compact solution keyword tag 904 in FIG. 9 may represent an example of compact solution keyword tags 1004-1014. In addition, condition-solution tree 1000 also includes sentiment 1016, sentiment 1018, sentiment 1020, sentiment 1022, sentiment 1024, and sentiment 1026, which correspond to compact solution keyword tag 1004, compact solution keyword tag 1006, compact solution keyword tag 1008, compact solution keyword tag 1010, compact solution keyword tag 1012, and compact solution keyword tag 1014, respectively. Sentiments 1016-1026 may be, for example, sentiments 232 in FIG. 2.

Illustrative embodiments insert question 1002, compact solution keyword tags 1004-1014, and corresponding sentiments 1016-1026 into the tree structure to illustrate a diagnosing process for the problem with the product corresponding to condition-solution tree 1000. Further, condition-solution tree 1000 includes reference links 1028. Reference links may be, for example, solution links 246 in FIG. 2 or links to solutions 334 in FIG. 3.

Figure 11:
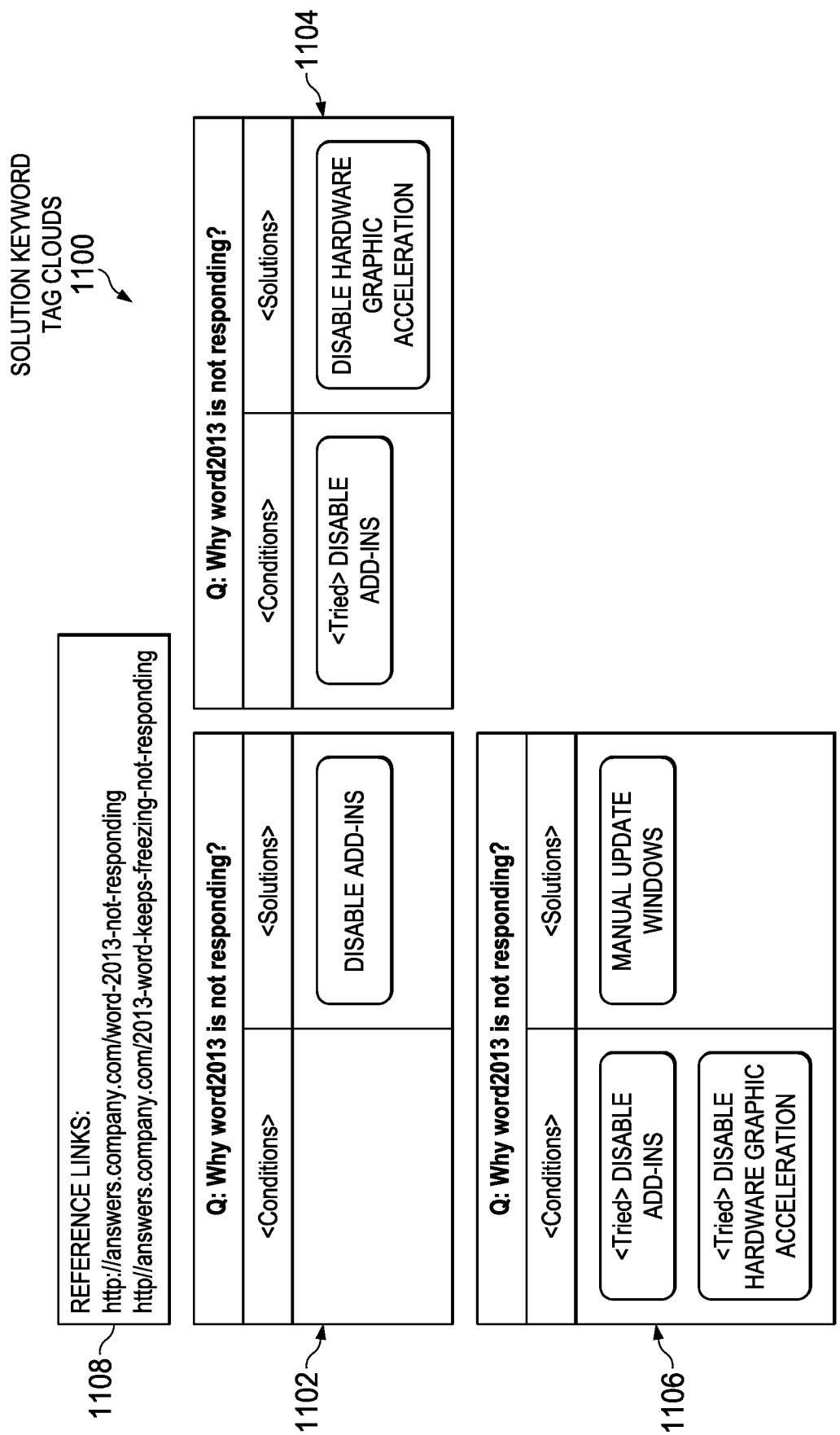
FIG. 11 is a diagram illustrating examples of solution keyword tag clouds in accordance with an illustrative embodiment.

With reference now to FIG. 11, a diagram illustrating examples of solution keyword tag clouds 1100 is depicted in accordance with an illustrative embodiment. Solution keyword tag cloud 1102, solution keyword tag cloud 1104, and solution keyword tag cloud 1106 may be, for example, solution keyword tag cloud 238 in FIG. 2 or solution keyword tag cloud 348 in FIG. 3.

In this example, solution keyword tag cloud 1102 initially shows one solution in the solutions section and no solutions in the conditions section. Solution keyword tag cloud 1104 shows the initial solution now in the condition section as tried and another solution in the solutions section. In other words, illustrative embodiments graphically update the solution keyword tag cloud as solutions are tried without resolving the problem indicated in the question section. Solution keyword tag cloud 1106 now shows the first two solutions as tried with another new solution in the solutions section. The solutions in solution keyword tag clouds 1102-1106 may be, for example, compact solution keyword tags 1008, 1012, and 1014 in FIG. 10.

In addition, illustrative embodiments may include reference links 1108, such as reference links 1028 in FIG. 10, with solution keyword tag clouds 1102-1106. Further, illustrative embodiments may confirm a version of the product if the version is not provided in the question section.

Figure 12:
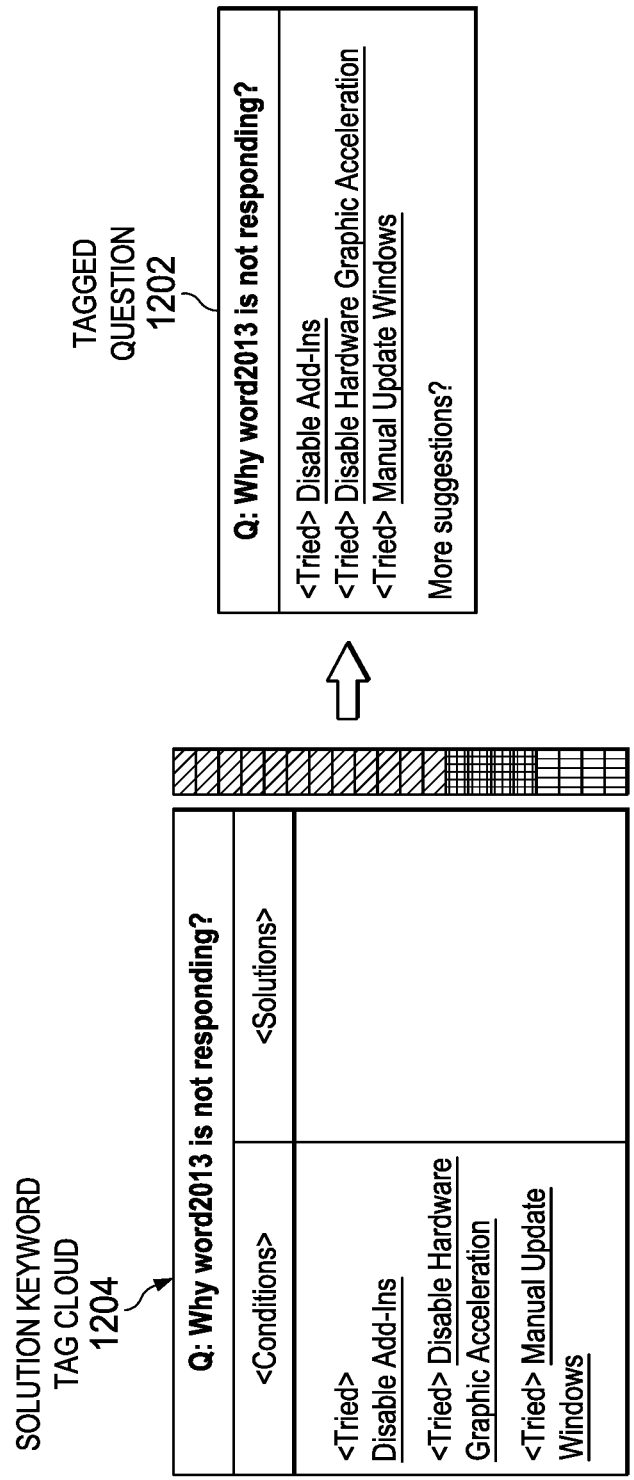
FIG. 12 is a diagram illustrating an example of a tagged question with full context information in accordance with an illustrative embodiment.

With reference now to FIG. 12, a diagram illustrating an example of a tagged question with full context information is depicted in accordance with an illustrative embodiment. Tagged question 1202 corresponds to solution keyword tag cloud 1204. Solution keyword tag cloud 1204 may be, for example, solution keyword tag cloud 1106 after the last solution in the solutions section is tried and failed to resolve the problem with the product. In other words, solution keyword tag cloud 1204 only contains conditions and no further solutions.

Tagged question 1202 may be, for example, tagged question 248 in FIG. 2. Tagged question 1202 contains full context information, such as the original question posted by the registered user, all previously tried solutions that did not resolve the particular issue experienced by the registered user, and a question asking for other suggestions or solutions on how to resolve the particular issue. Illustrative embodiments will post tagged question 1202 on one or more online posting sites, such as one or more of online posting sites 302 in FIG. 3, to stimulate further posts regarding the particular issue experienced by the registered user.

Figure 13:
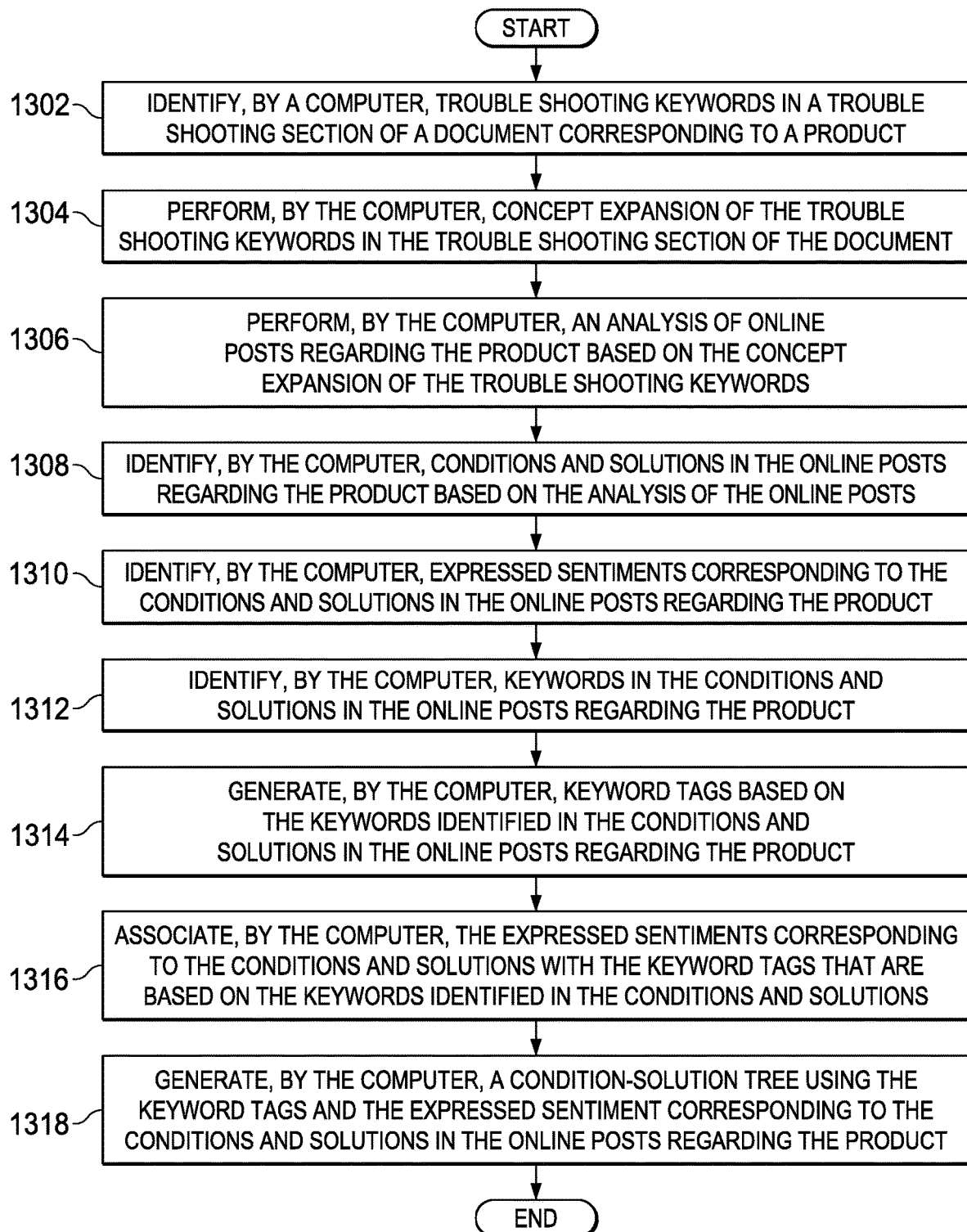
FIG. 13 is a flowchart illustrating a process for generating a condition-solution tree structure in accordance with an illustrative embodiment.

With reference now to FIG. 13, a flowchart illustrating a process for generating a condition-solution tree structure is shown in accordance with an illustrative embodiment. The process shown in FIG. 13 may be implemented in a computer, such as, for example, server 104 in FIG. 1 or data processing system 200 in FIG. 2.

The process begins when the computer identifies trouble shooting keywords in a trouble shooting section of a document corresponding to a product (step 1302). The trouble shooting keywords may be, for example, trouble shooting keywords 222 in FIG. 2. The document corresponding to the product may be, for example, product data 220 in FIG. 2.

In addition, the computer performs concept expansion of the trouble shooting keywords found in the trouble shooting section of the document (step 1304). The concept expansion of the trouble shooting keywords may be, for example, trouble shooting keyword concept expansion 224 in FIG. 2. Further, the computer performs an analysis of online posts regarding the product based on the concept expansion of the trouble shooting keywords (step 1306). The computer may utilize, for example, natural language processing to analyze the online posts. The online posts may be, for example, online posts 226 in FIG. 2, online post 400 in FIG. 4, response posts 500 in FIG. 5, and other response post 702 in FIG. 7.

Afterward, the computer identifies conditions and solutions in the online posts regarding the product based on the analysis of the online posts (step 1308). The conditions and solutions may be, for example, conditions-solutions 228 in FIG. 2. The computer also identifies expressed sentiments corresponding to the conditions and solutions in the online posts regarding the product (step 1310). The computer may utilize, for example, natural language processing to identify the expressed sentiments. The expressed sentiments may be, for example, sentiments 232 in FIG. 2. In addition, the computer identifies keywords in the conditions and solutions in the online posts regarding the product (step 1312).

Subsequently, the computer generates keyword tags based on the keywords identified in the conditions and solutions in the online posts regarding the product (step 1314). The keyword tags may be, for example, solution keyword tags 234 in FIG. 2. Further, the computer associates the expressed sentiments corresponding to the conditions and solutions with the keyword tags that are based on the keywords identified in the conditions and solutions (step 1316). Furthermore, the computer generates a condition-solution tree using the keyword tags and the expressed sentiment corresponding to the conditions and solutions in the online posts regarding the product (step 1318). The condition solution tree may be, for example, condition-solution tree 236 in FIG. 2 or condition-solution tree 1000 in FIG. 10. Thereafter, the process terminates.

Figure 14A:
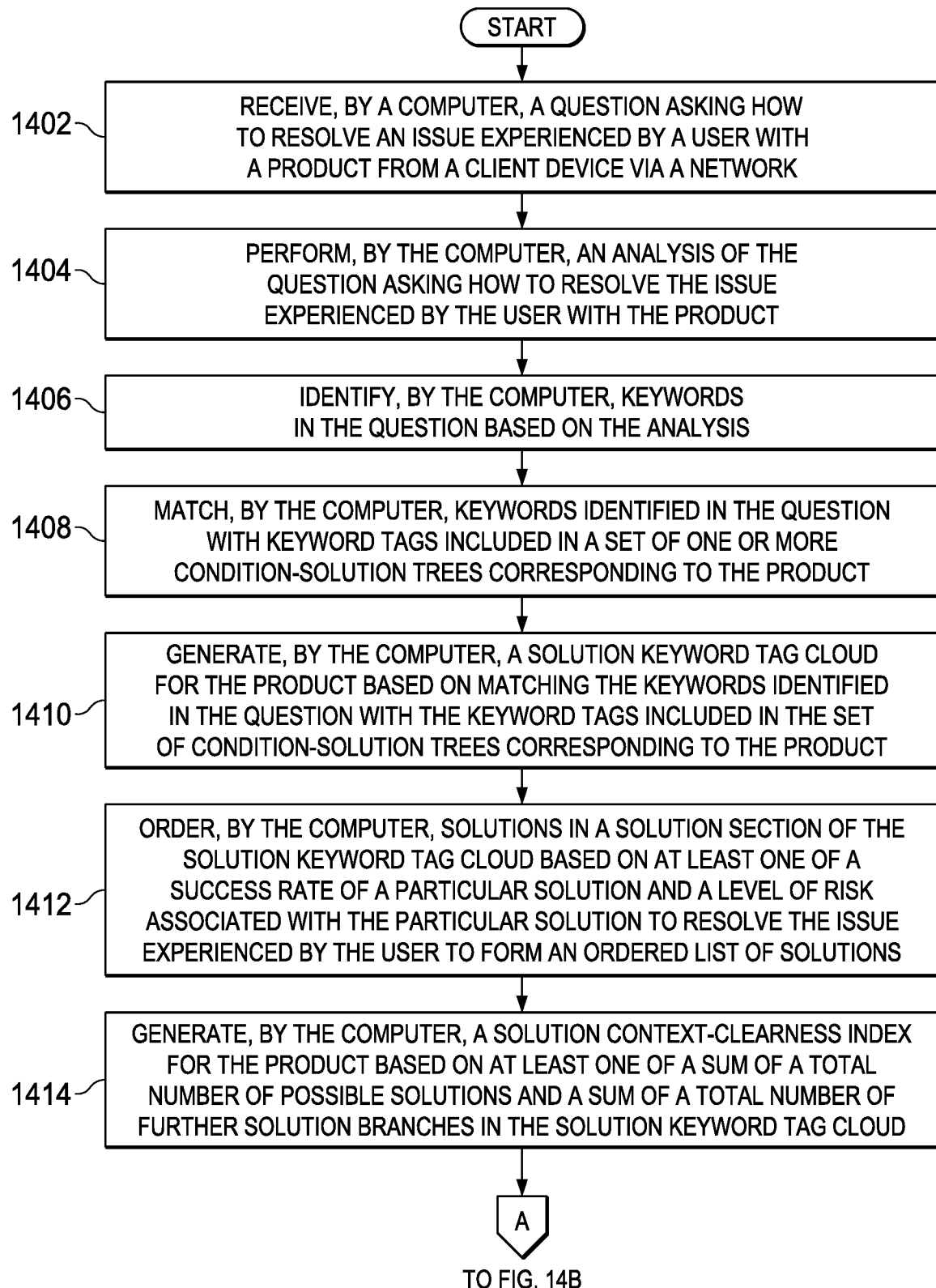
FIGS. 14A-14B are a flowchart illustrating a process for generating a solution keyword tag cloud with solution context-clearness index in accordance with an illustrative embodiment.
Figure 14B:
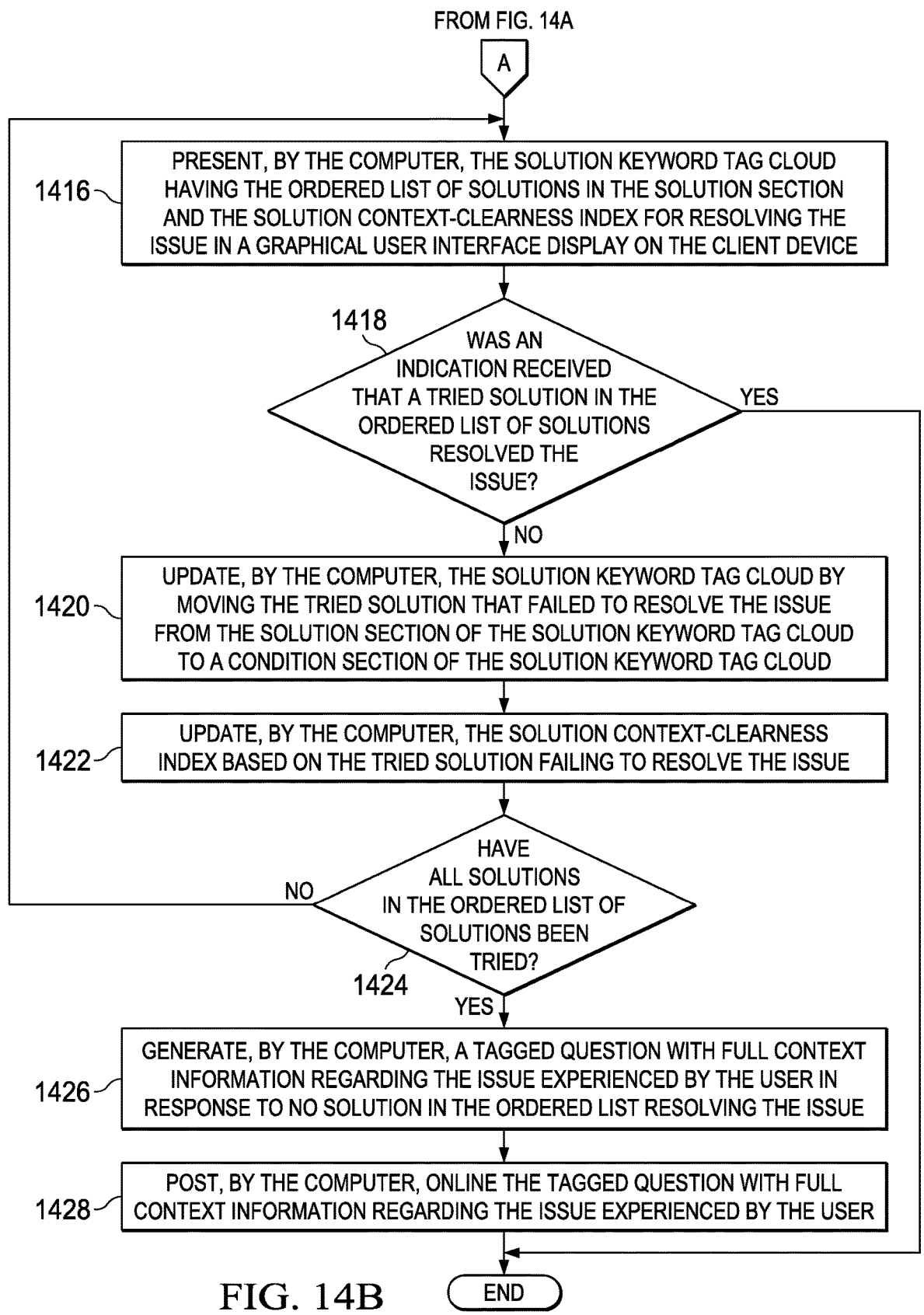

With reference now to FIGS. 14A-14B, a flowchart illustrating a process for generating a solution keyword tag cloud with solution context-clearness index is shown in accordance with an illustrative embodiment. The process shown in FIGS. 14A-14B may be implemented in a computer, such as, for example, server 104 in FIG. 1 or data processing system 200 in FIG. 2.

The process begins when the computer receives a question asking how to resolve an issue experienced by a user with a product from a client device via a network (step 1402). The client device may be, for example, client 110 in FIG. 1 or client device 306 in FIG. 3. The network may be, for example, network 102 in FIG. 1.

The computer performs an analysis of the question asking how to resolve the issue experienced by the user with the product (step 1404). The computer may utilize, for example, natural language processing to analyze the question. In addition, the computer identifies keywords in the question based on the analysis (step 1406).

Afterward, the computer matches keywords identified in the question with keyword tags included in a set of one or more condition-solution trees corresponding to the product (step 1408). The keyword tags may be, for example, solution keyword tags 1008, 1012, and 1014 in FIG. 10. The set of one or more condition-solution trees may be, for example, condition-solution tree 1000 in FIG. 1.

Further, the computer generates a solution keyword tag cloud for the product based on matching the keywords identified in the question with the keyword tags included in the set of condition-solution trees corresponding to the product (step 1410). The solution keyword tag cloud may be, for example, solution keyword tag cloud 1106 in FIG. 11. Furthermore, the computer orders solutions in a solution section of the solution keyword tag cloud based on at least one of a success rate of a particular solution and a level of risk associated with the particular solution to resolve the issue experienced by the user to form an ordered list of solutions (step 1412). The solution section of the solution keyword tag cloud may be, for example, solution section 240 in FIG. 2 or solution section 354 in FIG. 3.

Moreover, the computer generates a solution context-clearness index for the product based on at least one of a sum of a total number of possible solutions and a sum of a total number of further solution branches in the solution keyword tag cloud (step 1414). The solution context-clearness index may be, for example, solution context-clearness index 244 in FIG. 2 or solution context-clearness index 350 in FIG. 3. Then, the computer presents the solution keyword tag cloud having the ordered list of solutions in the solution section and the solution context-clearness index for resolving the issue in a graphical user interface display on the client device (step 1416).

Subsequently, the computer makes a determination as to whether the computer received an indication that a tried solution in the ordered list of solutions resolved the issue (step 1418). If the computer determines that an indication was received indicating that a tried solution in the ordered list of solutions resolved the issue, yes output of step 1418, then the process terminates thereafter. If the computer determines that the computer received an indication that a tried solution in the ordered list of solutions did not resolve the issue, no output of step 1418, then the computer graphically updates the solution keyword tag cloud by moving the tried solution that failed to resolve the issue from the solution section of the solution keyword tag cloud to a condition section of the solution keyword tag cloud (step 1420). The condition section of solution keyword tag cloud may be, for example, condition section 242 in FIG. 2 or condition section 356 in FIG. 3. The computer also updates the solution context-clearness index based on the tried solution failing to resolve the issue (step 1422).

Afterward, the computer makes a determination as to whether all solutions in the ordered list of solutions have been tried (step 1424). If the computer determines that not all solutions in the ordered list of solutions have been tried, no output of step 1424, then the process returns to step 1416 where the computer continues to present the solution keyword tag cloud. If the computer determines that all solutions in the ordered list of solutions have been tried, yes output of step 1424, then the computer generates a tagged question with full context information regarding the issue experienced by the user in response to no solution in the ordered list resolving the issue (step 1426). The tagged question may be, for example, tagged question 248 in FIG. 2 or tagged question 1202 in FIG. 12. In addition, the computer posts online the tagged question with full context information regarding the issue experienced by the user (step 1428). Thereafter, the process terminates.

Thus, illustrative embodiments of the present invention provide a computer-implemented method, computer system, and computer program product for automatically generating a solution keyword tag cloud with solution context-clearness index based on analyzing online posts, which correspond to an issue or problem experienced by a user of a product or service, in a support form. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating a solution keyword tag cloud, the computer-implemented method comprising:
   generating, by a computer, the solution keyword tag cloud for a product based on matching keywords identified in a question asking how to resolve an issue experienced by a user with the product with keyword tags included in a set of condition-solution trees corresponding to the product, wherein the solution keyword tag cloud is a text box including a question section that contains the question asking how to resolve the issue, a solution section that contains a set of solutions not yet tried for resolving the issue, and a condition section that contains tried solutions failing to resolve the issue;
   responsive to the computer receiving an indication that a tried solution in the solution keyword tag cloud did not resolve the issue experienced by the user, graphically updating, by the computer, the solution keyword tag cloud by moving the tried solution that failed to resolve the issue from the solution section of the solution keyword tag cloud to the condition section of the solution keyword tag cloud;
   presenting, by the computer, the solution keyword tag cloud in a graphical user interface display on a client device corresponding to the user;
   responsive to the computer determining that all solutions in the solution keyword tag cloud have been tried, generating, by the computer, a tagged question with context information regarding the issue experienced by the user; and
   posting, by the computer, in an online posting site the tagged question with context information regarding the issue experienced by the user, wherein the tagged question includes the question originally submitted by the user, all the previously tried solutions that failed to resolve the issue experienced by the user with the product, and a question asking for other suggestions on how to resolve the issue.

2. The computer-implemented method of claim 1 further comprising:
   ordering, by the computer, solutions in the solution section of the solution keyword tag cloud based on a success rate of a particular solution and a level of risk associated with the particular solution to resolve the issue experienced by the user to form an ordered list of solutions.

3. The computer-implemented method of claim 1 further comprising:
   generating, by the computer, a graphical solution context-clearness index for the product that allows the user to graphically visualize how close the user is to approaching a last solution for the issue with the product based on at least one of a sum of a total number of possible solutions and a sum of a total number of further solution branches in the solution keyword tag cloud.

4. The computer-implemented method of claim 3, wherein the computer presents the solution keyword tag cloud with the graphical solution context-clearness index in the graphical user interface display on the client device corresponding to the user.

5. The computer-implemented method of claim 1 further comprising:
   identifying, by the computer, the keywords in the question asking how to resolve the issue experienced by the user with the product; and
   matching, by the computer, the keywords identified in the question with the keyword tags included in the set of condition-solution trees corresponding to the product.

6. The computer-implemented method of claim 1, wherein the computer presents links to solutions with the solution keyword tag cloud in the graphical user interface display on the client device corresponding to the user.

7. A computer-implemented method for generating a solution keyword tag cloud, the computer-implemented method comprising:
   generating, by a computer, the solution keyword tag cloud for a product based on matching keywords identified in a question asking how to resolve an issue experienced by a user with the product with keyword tags included in a set of condition-solution trees corresponding to the product, wherein the solution keyword tag cloud is a text box including a question section that contains the question asking how to resolve the issue, a solution section that contains a set of solutions not yet tried for resolving the issue, and a condition section that contains tried solutions failing to resolve the issue;
   responsive to the computer receiving an indication that a tried solution in the solution keyword tag cloud did not resolve the issue experienced by the user, graphically updating, by the computer, the solution keyword tag cloud by moving the tried solution that failed to resolve the issue from the solution section of the solution keyword tag cloud to the condition section of the solution keyword tag cloud;
   presenting, by the computer, the solution keyword tag cloud in a graphical user interface display on a client device corresponding to the user;
   identifying, by the computer, trouble shooting keywords in a trouble shooting section of a document corresponding to the product; and
   performing, by the computer, concept expansion of the trouble shooting keywords found in the trouble shooting section of the document.

8. The computer-implemented method of claim 7 further comprising:
   performing, by the computer, an analysis of online posts regarding the product based on the trouble shooting keywords and the concept expansion of the trouble shooting keywords; and
   identifying, by the computer, conditions and solutions in the online posts regarding the product based on the analysis of the online posts regarding the product.

9. The computer-implemented method of claim 8, wherein the computer identifies a command sentence as a solution in the online posts, and wherein the computer eliminates frequently-used keywords in the command sentence and uses remaining infrequently-used keywords in the command sentence to generate a keyword tag.

10. The computer-implemented method of claim 8 further comprising:
    identifying, by the computer, sentiments corresponding to the conditions and solutions in the online posts regarding the product.

11. The computer-implemented method of claim 10 further comprising:
  identifying, by the computer, keywords in the conditions and solutions found in the online posts regarding the product;
  generating, by the computer, the keyword tags based on the keywords identified in the conditions and solutions; and
  associating, by the computer, the sentiments corresponding to the conditions and solutions with the keyword tags that are based on the keywords identified in the conditions and solutions.

12. The computer-implemented method of claim 11 further comprising:
  generating, by the computer, the set of condition-solution trees corresponding to the product using the keyword tags and applying sentiment values to each of the keyword tags in the set of condition-solution trees.

13. A computer system for generating a solution keyword tag cloud, the computer system comprising:
  a bus system;
  a storage device connected to the bus system, wherein the storage device stores program instructions; and
  a processor connected to the bus system, wherein the processor executes the program instructions to:
    generate the solution keyword tag cloud for a product based on matching keywords identified in a question asking how to resolve an issue experienced by a user with the product with keyword tags included in a set of condition-solution trees corresponding to the product, wherein the solution keyword tag cloud is a text box including a question section that contains the question asking how to resolve the issue, a solution section that contains a set of solutions not yet tried for resolving the issue, and a condition section that contains tried solutions failing to resolve the issue;
    graphically update the solution keyword tag cloud by moving a tried solution that failed to resolve the issue from the solution section of the solution keyword tag cloud to the condition section of the solution keyword tag cloud in response to receiving an indication that the tried solution in the solution keyword tag cloud did not resolve the issue experienced by the user;
    present the solution keyword tag cloud in a graphical user interface display on a client device corresponding to the user;
    generate a tagged question with context information regarding the issue experienced by the user responsive to the computer determining that all solutions in the solution keyword tag cloud have been tried; and
    post in an online posting site the tagged question with context information regarding the issue experienced by the user, wherein the tagged question includes the question originally submitted by the user, all the previously tried solutions that failed to resolve the issue experienced by the user with the product, and a question asking for other suggestions on how to resolve the issue.

14. The computer system of claim 13, wherein the processor further executes the program instructions to:
  order solutions in the solution section of the solution keyword tag cloud based on a success rate of a particular solution and a level of risk associated with the particular solution to resolve the issue experienced by the user to form an ordered list of solutions.

15. The computer system of claim 13, wherein the processor further executes the program instructions to:
  generate a graphical solution context-clearness index for the product that allows the user to graphically visualize how close the user is to approaching a last solution for the issue with the product based on at least one of a sum of a total number of possible solutions and a sum of a total number of further solution branches in the solution keyword tag cloud.

16. The computer system of claim 15, wherein the solution keyword tag cloud is presented with the solution context-clearness index in the graphical user interface display on the client device corresponding to the user.

17. A computer program product for generating a solution keyword tag cloud, the computer program product comprising a computer readable storage medium having program instructions embodied therewith, the program instructions executable by a computer to cause the computer to perform a method comprising:
  generating, by the computer, the solution keyword tag cloud for a product based on matching keywords identified in a question asking how to resolve an issue experienced by a user with the product with keyword tags included in a set of condition-solution trees corresponding to the product, wherein the solution keyword tag cloud is a text box including a question section that contains the question asking how to resolve the issue, a solution section that contains a set of solutions not yet tried for resolving the issue, and a condition section that contains tried solutions failing to resolve the issue;
  responsive to the computer receiving an indication that a tried solution in the solution keyword tag cloud did not resolve the issue experienced by the user, graphically updating, by the computer, the solution keyword tag cloud by moving the tried solution that failed to resolve the issue from the solution section of the solution keyword tag cloud to the condition section of the solution keyword tag cloud;
  presenting, by the computer, the solution keyword tag cloud in a graphical user interface display on a client device corresponding to the user;
  responsive to the computer determining that all solutions in the solution keyword tag cloud have been tried, generating, by the computer, a tagged question with context information regarding the issue experienced by the user; and
  posting, by the computer, in an online posting site the tagged question with context information regarding the issue experienced by the user, wherein the tagged question includes the question originally submitted by the user, all the previously tried solutions that failed to resolve the issue experienced by the user with the product, and a question asking for other suggestions on how to resolve the issue.

18. The computer program product of claim 17 further comprising:
  ordering, by the computer, solutions in the solution section of the solution keyword tag cloud based on a success rate of a particular solution and a level of risk associated with the particular solution to resolve the issue experienced by the user to form an ordered list of solutions.

19. The computer program product of claim 17 further comprising:
  generating, by the computer, a graphical solution context-clearness index for the product that allows the user to graphically visualize how close the user is to approaching a last solution for the issue with the product based on at least one of a sum of a total number of possible solutions and a sum of a total number of further solution branches in the solution keyword tag cloud.

20. The computer program product of claim 19, wherein the computer presents the solution keyword tag cloud with the solution context-clearness index in the graphical user interface display on the client device corresponding to the user.

21. The computer program product of claim 17 further comprising:
- identifying, by the computer, the keywords in the question asking how to resolve the issue experienced by the user with the product; and
- matching, by the computer, the keywords identified in the question with the keyword tags included in the set of condition-solution trees corresponding to the product.

* * * * *